(12) United States Patent
Gelbart

(10) Patent No.: US 6,665,048 B2
(45) Date of Patent: Dec. 16, 2003

(54) METHOD FOR IMAGING A CONTINUOUSLY MOVING OBJECT

(75) Inventor: Daniel Gelbart, Vancouver (CA)

(73) Assignee: Creo Inc., Burnaby (CA)

( * ) Notice: Subject to any disclaimer, the term of this patent is extended or adjusted under 35 U.S.C. 154(b) by 0 days.

(21) Appl. No.: 10/051,016

(22) Filed: Jan. 22, 2002

(65) Prior Publication Data

US 2003/0197835 A1 Oct. 23, 2003

(51) Int. Cl.[7] .................. G03B 27/62; G03B 27/70; G03B 21/00; G03B 21/28
(52) U.S. Cl. ............... 355/47; 355/66; 353/46; 353/122; 353/98
(58) Field of Search .............. 355/66, 72, 73, 355/74, 47, 18, 53; 353/46, 50, 79, 98, 99, 122, 51; 347/243; 359/223, 226; 348/771, 744; 396/20–24, 549, 550; 358/3.29, 3.3, 3.31, 3.32; 346/107.1, 107.3

(56) References Cited

U.S. PATENT DOCUMENTS

| | | | |
|---|---|---|---|
| 4,102,734 A | * | 7/1978 | Schiffman .................. 430/322 |
| 4,924,257 A | | 5/1990 | Jain |
| 4,956,655 A | * | 9/1990 | Wakebe ...................... 353/101 |
| 5,049,901 A | | 9/1991 | Gelbart |
| 5,132,723 A | | 7/1992 | Gelbart |
| 5,208,818 A | | 5/1993 | Gelbart et al. |
| 5,325,116 A | | 6/1994 | Sampsell |
| 5,330,878 A | | 7/1994 | Nelson |
| 5,457,566 A | | 10/1995 | Sampsell et al. |
| 5,691,541 A | | 11/1997 | Ceglio et al. |
| 5,870,176 A | | 2/1999 | Sweatt et al. |
| 5,923,359 A | | 7/1999 | Montgomery |
| 6,060,224 A | | 5/2000 | Sweatt et al. |
| 6,133,986 A | | 10/2000 | Johnson |
| 6,151,099 A | * | 11/2000 | Okamura et al. ............. 355/47 |
| 6,215,579 B1 | | 4/2001 | Bloom et al. |
| 6,248,509 B1 | | 6/2001 | Sanford |
| 6,251,550 B1 | | 6/2001 | Ishikawa |
| RE37,376 E | | 9/2001 | Gelbart |
| 6,426,781 B1 | * | 7/2002 | Lee ........................... 348/754 |

* cited by examiner

Primary Examiner—Russell Adams
Assistant Examiner—Andrew Sever
(74) Attorney, Agent, or Firm—Oyen Wiggs Green & Mutala

(57) ABSTRACT

A continuously moving object is imaged by a video projector producing a rapid sequence of stationary images. A galvanometer actuated mirror tracks the motion of the moving object and synchronizes it to the sequence of stationary images in order to avoid motion caused blurring of the images. The moving object is flat or is wrapped around a cylinder.

13 Claims, 2 Drawing Sheets

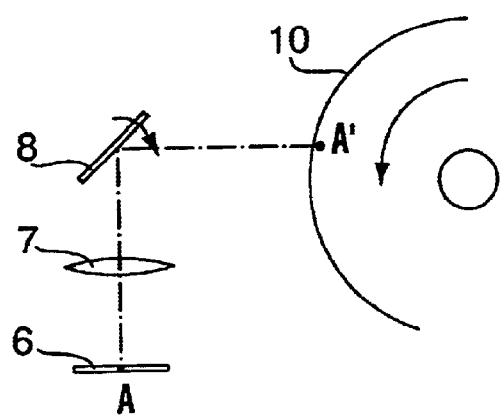
FIG. 2-a
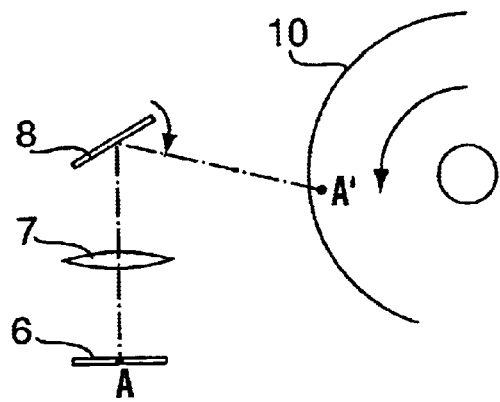
FIG. 2-b
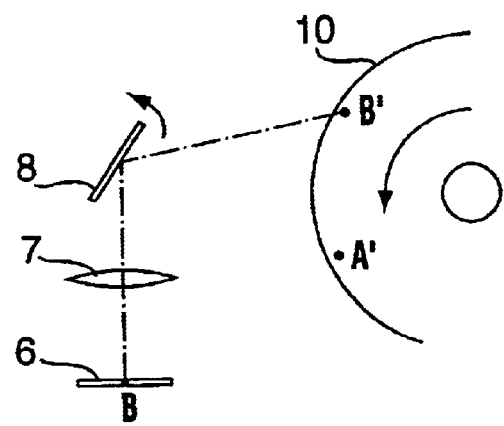
FIG. 2-c

METHOD FOR IMAGING A CONTINUOUSLY MOVING OBJECT

FIELD OF INVENTION

The invention relates to imaging, and specific embodiments of the invention relate more particularly to projecting stationary images onto a moving object.

BACKGROUND ON THE INVENTION

In various industries employing photo-lithography, there is a desire to use two-dimensional light valves to project images onto moving objects. One typical use for such image projection involves projecting a UV image in order to expose a UV sensitive material, such as photoresist or photopolymer. One advantage of two-dimensional light valves (as compared to lasers) is that low brightness sources, such as arc lamps, can be used with light valves. The best known device using a light valve to project an image is the video projector, which is commonly used to project video and computer generated images onto a screen. Prior art systems for projecting images onto moving objects use one of the following methods:

a) Using a step-and-repeat technique, wherein the object is stepped over a certain movement and then is held stationary at the moment of imaging. The stepping and imaging may then be repeated a number of times to complete the image;

b) Synchronizing the image to the motion of the object by shifting the data in the light valve. See, for example, U.S. Pat. Nos. 5,049,901; 5,208,818; and 5,132,723.

c) Moving both the light valve and the object at the same time. See, for example U.S. Pat. Nos. 5,870,176 and 6,060,224;

d) Dividing the image into columns and using an acousto-optic modulator to synchronize the image with the motion one column at a time. See, for example, U.S. Pat. Nos. RE37,376E and 5,923,359.

None of these techniques involve using a stationary light valve based projector to project a series of stationary images in a rapid sequence to image a continuously moving object.

SUMMARY OF THE INVENTION

The invention uses a scanning device between an image source, typically a commercial video projector, and a moving object, typically a planar object which may be coated with photoresist. The scanning device allows the projector and the projected image to remain stationary while the scanning device tracks the motion of the moving object until one frame is exposed. At the end of each frame the scanning device resets to the initial position while the image source changes the image to the next frame. The process repeats itself until a complete stripe of images is recorded. For imaging in the UV, the video projector lamp and the optics may be modified in order to enhance the UV output. After one stripe of images is recorded, further stripes may be imaged using a conventional two-dimensional scanning method. Either stepping motion or continuous helical motion can be used to scan the second dimension of the object.

The invention allows the use of a low cost, off-the-shelf video projector as a lithographic imaging device, without requiring step-and-repeat type motion of the object or the imaging source. One advantage of a continuous mechanical motion over a stepped motion is in a smoother, more accurate and more reliable mechanical system. The present invention is particularly useful in the following applications: the production of printing plates (both lithographic and flexographic), the production of printed circuit boards (also known as "direct imaging"), the production of displays and the production of solid objects from photonolymer.

BRIEF DESCRIPTION OF THE DRAWINGS

FIGS. 2-a to 2-c show a sequence of tracking one frame and switching to the next frame in the embodiment of FIG. 1.

DESCRIPTION OF THE PREFERRED EMBODIMENT

Figure 1:
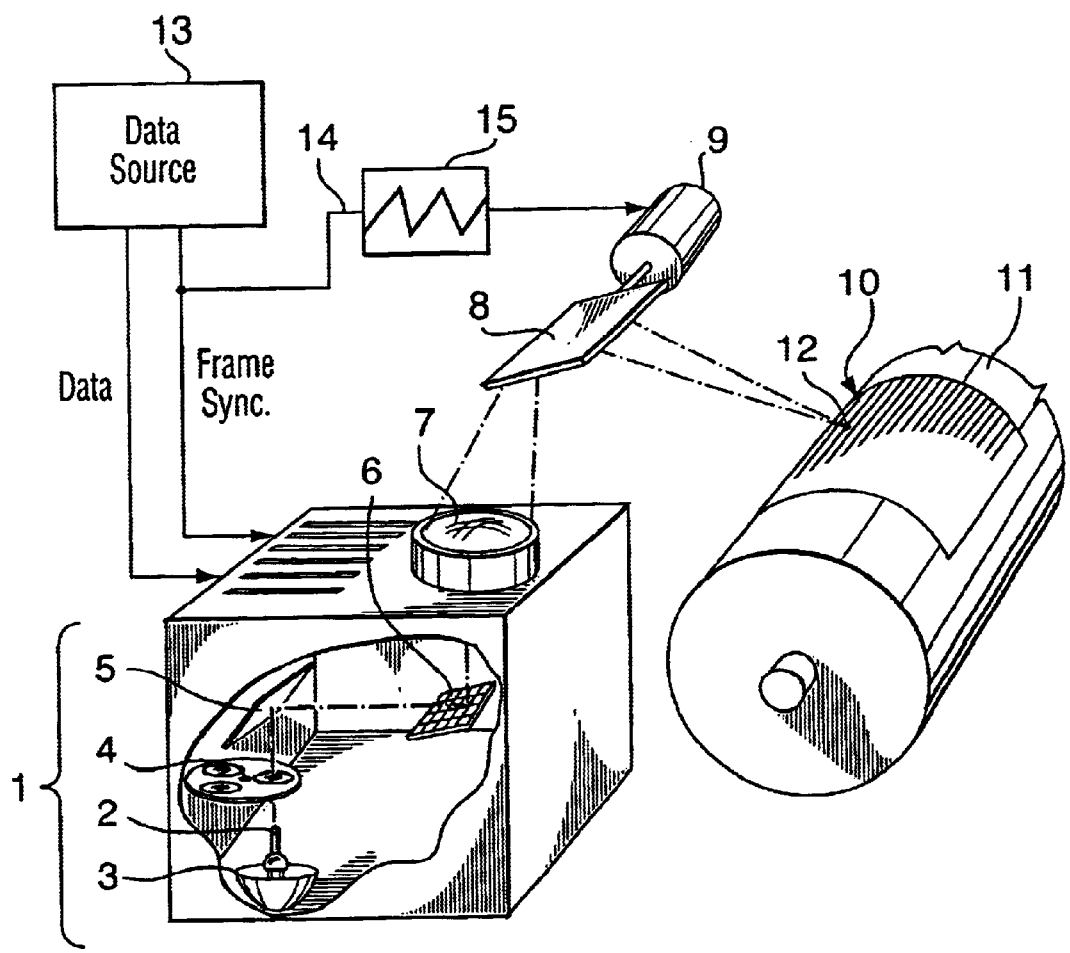
FIG. 1 is a schematic representation of a particular embodiment of the invention.

FIG. 1 shows a generalized view of a commercial video projector 1. For clarity, FIG. 1 depicts a cut-away view of projector 1 showing some of its components which include: a light source 2, typically a SHP type or UHP type arc lamp, a reflector 3, typically of the dichroic type, a rotating filter wheel 4, typically containing Red, Green and Blue filters, various mirrors 5 and a light valve 6. In a preferred embodiment, light valve 6 comprises a DMD (Digital Mirror Device), such as the one-made by Texas Instruments of Plano, Tex.). The two-dimensional image formed by light valve 6 is projected by lens 7 and mirror 8 onto moving object 10. In the illustrated embodiment, moving object 10 is mounted on continuously rotating drum 11. Light valve 6 forms an image 12 on object 10. In one particular embodiment, object 10 is a lithographic printing plate comprising a light sensitive coating. Mirror 8 is mounted on a fast galvanometer 9. Video projector 1 can be configured for various light spectra. For example, if object 10 is a printing plate comprising a UV sensitive coating, it is advantageous to maximize the light output of projector 1 in the UV range. The light output of projector 1 in the UV range may be maximized by replacing the filters in filter wheel 4 with filters that transmit UV light and block visible and infra-red light and/or changing the dichroic coating on reflector 3 to a coating which reflects UV and transmits other wavelengths. If reflector 3 is effective to provide a sufficient amount of UV output from projector 1, the filters on wheel 4 can be simply removed. In some lithographic imaging applications, it may also be desirable to replace lens 7 with a lens which is optimized for UV and which has a desired magnification ratio. When object 10 is a lithographic printing plate, lens 7 Preferably has a magnification of about 1:1.

Projector 1 is connected to a data source 13 in a conventional manner. Signal 14 is used to synchronize the projected frames (typically 60 per second) to data source 13, and is also used to synchronize galvanometer 9 via saw-tooth generator 15. All components of the system shown in FIG. 1 are well known, commercially available components which can be purchased as complete functional assemblies. As such, no further details regarding these components are provided herein.

The operation of the FIG. 1 system is shown in FIG. 2-a to FIG. 2-c, which should be viewed in conjunction with FIG. 1. Mirror 8 is rotated at a velocity which makes the projection of any image point on light valve 6, stay stationary relative to moving object 10. As shown in FIG. 2a, image point A on light valve 6 is projected onto object 10 as point A'. Projected point A' stays stationary relative to moving object 10. Since object 10 is moving at a constant velocity, mirror 8 preferably rotates in an approximately linear fashion. At the end of the travel of mirror 8, shown in FIG. 2-*b*, mirror 8 has to return as fast as possible to the starting position, as shown in FIG. 2-*c*. At the moment between FIG. 2-*b* and FIG. 2-*c*, the image on light valve 6 is changing. In FIG. 2-*c*, mirror 8 has returned to its starting position and the image on light valve 6 has changed. As shown in FIG. 2-*c*, new image point B is projected onto object 10 as point B', again stationary relative to moving object 10. The images containing points A and B can be imaged in a contiguous manner on object 10 or in an overlapping manner. The degree of overlap is determined by the ratio of the image size to the range of motion of object 10 during one image (frame) interval. The amount of overlap of successive images may be controlled by adjusting the speed of object 10 relative to the frame rate of projector 1. Obviously the image data has to be changed in data source 13 to reflect the correct overlap.

Saw-tooth waveform generator 15 is preferably a digital device including provisions for a look-up table. Such a table allows modification of the profile of the saw-tooth waveform to compensate for optical distortion introduced by the scanning process. Galvanometer drivers including look-up tables are well known in the art and commercially available.

The motion of object 10 may be a linear motion instead of a rotary motion. A linear motion may be used when scanning flat and rigid objects which cannot be wrapped around a drum. Examples of applications wherein this invention may be applied to image objects that move linearly include: the imaging of glass panels for electronic displays and the imaging of printed circuit boards, when imaging a flat object moving back and forth, the imaging process can be performed in both directions by reversing the direction at the galvanometer when motion direction is reversed.

One example embodiment of the invention involves a computer-to-plate machine used in the printing industry. Projector 1 is Model 340B made by InFocus (Wilsonville, Oreg.). All of the filters are removed from filter wheel 4 and dichroic reflector 3 is replaced with a UV-enhancing reflector optimized from 200 nm to 450 nm. The lens 7 is replaced with a fused-silica UV lens with a 1.04:1 magnification ratio of the double-gauss configuration. Mirror 8 and galvanometer 9 are made by Cambridge Instrument (Cambridge, Mass.), Model 6230. The frame rate used is 60 Hz, with a saw-tooth rise time of 15 mS and a retrace time of about 1.6 mS. The saw-tooth is generated by a standard function generator. The moving object 10 is a lithographic printing plate of the projection type having a sensitivity of about 5 mJ/cm 2 for UV light. The projected image is 600×800 pixels or about 6.34 mm×8.46 mm. The speed of the drum 11 is adjusted to cover 6.34 mm in 15 mS, giving 0.42 m/S. For a plate size of 50 cm×70 cm and a drum circumference of 60 cm, a complete image is written in about two minutes.

It is also clear that the relative motions of the projector 1 and object 10 can be reversed, and have projector 1 as well as galvanometer 9 and mirror 8 continuously moving while object 10 is stationary. Such a configuration is advantageous when object 10 is bulky, such as a container of liquid photopolymer.

What is claimed is:

1. A method of projecting images from a two-dimensional light valve onto a continuously moving object, said method comprising placing a scanning element between said light valve and said object, said scanning element synchronized with said light valve and said object in a manner which makes said image stationary relative to said object.

2. A method as in claim 1, wherein said light valve is part of a video projector.

3. A method as in claim 1 wherein said light valve is a Deformable Mirror Device.

4. A method as in claim 1 wherein said object is a lithographic printing plate.

5. A method as in claim 1 wherein said object is a printed circuit board.

6. A method as in claim 1 wherein said scanning element is a galvanometer driven mirror.

7. A method as in claim 6 wherein said galvanometer includes provisions for electronically controlling scan linearity.

8. A method of projecting images from a two-dimensional light valve onto an object while relative motion exists between said light valve and said object, said method comprising placing a scanning element between said light valve and said object, said scanning element making said images temporarily stationary relative to said object.

9. A method as in claim 8 wherein said object is a liquid photopolymer.

10. A method of projecting images from a two-dimensional light valve onto a continuously moving object, said light valve generating a rapid sequence of stationary images, said method comprising placing a scanning element between said light valve and said object, said scanning device making each one of said stationary images appear stationary relative to said moving object.

11. A method as in claim 10 wherein said scanning element is a galvanometer driven mirror and said galvanometer includes provisions for electronically controlling scan linearity.

12. A method as in claim 10 wherein said object is a printing plate.

13. A method as in claim 10 wherein said object is a printed circuit board.

* * * * *

(12) EX PARTE REEXAMINATION CERTIFICATE (6133rd)
United States Patent
Gelbart

(10) Number: US 6,665,048 C1
(45) Certificate Issued: Feb. 26, 2008

(54) METHOD FOR IMAGING A CONTINUOUSLY MOVING OBJECT

(75) Inventor: Daniel Gelbart, Vancouver (CA)

(73) Assignee: Creo Inc., Burnaby, British Columbia (CA)

Reexamination Request:
No. 90/007,277, Nov. 1, 2004

Reexamination Certificate for:
Patent No.: 6,665,048
Issued: Dec. 16, 2003
Appl. No.: 10/051,016
Filed: Jan. 22, 2002

(51) Int. Cl.
*G03B 21/00* (2006.01)

(52) U.S. Cl. ............... 355/47; 355/66; 353/122; 353/46; 353/98

(58) Field of Classification Search ............ 355/47, 355/66; 353/122, 46, 98
See application file for complete search history.

(56) References Cited

U.S. PATENT DOCUMENTS

| 4,073,586 | A | * | 2/1978 | Favreau et al. ............... 355/20 |
| 4,307,930 | A | * | 12/1981 | Saito .......................... 359/201 |
| 5,114,224 | A | * | 5/1992 | Miyamoto et al. .......... 353/122 |
| 6,243,057 | B1 | * | 6/2001 | Blaxtan et al. ............... 345/84 |
| 6,590,632 | B2 | | 7/2003 | Sumi |
| 6,700,597 | B2 | | 3/2004 | Fujii |

FOREIGN PATENT DOCUMENTS

| JP | 1-276883 | * | 11/1989 |
| JP | 6-95257 | * | 4/1994 |
| JP | 7-199383 | * | 8/1995 |

* cited by examiner

*Primary Examiner*—Albert J Gagliardi

(57) ABSTRACT

A continuously moving object is imaged by a video projector producing a rapid sequence of stationary images. A galvanometer acuated mirror tracks the motion of the moving object and synchronizes it to the sequence of stationary images in order to avoid motion caused blurring of the images. The moving object is flat or is wrapped around a cylinder.

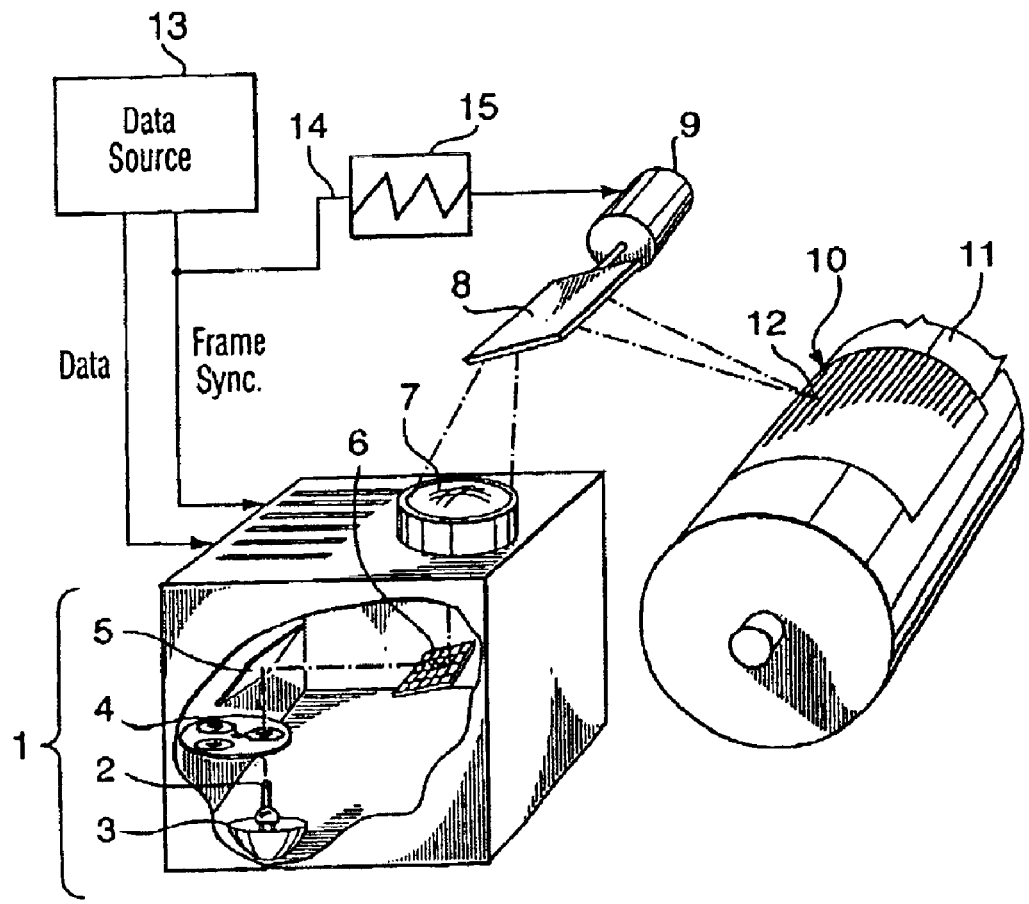

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9, 10 and 12 are cancelled.

Claims 2–6, 8, 11 and 13 are determined to be patentable as amended.

Claim 7, dependent on an amended claim, is determined to be patentable.

New claims 14–16 and 17 are added and determined to be patentable.

2. A method [as in claim 1.] *of projecting images from a two-dimensional light valve onto a continuously moving object, said method comprising placing a scanning element between said light valve and said object, said scanning element synchronized with said light valve and said object in a manner which makes said image stationary relative to said object* wherein said light valve is part of a *commercial* video projector.

3. A method as in claim [1] *2* wherein said light valve is a Deformable Mirror Device.

4. A method as in claim [1] *2* wherein said object is a lithographic printing plate.

5. A method [as in claim 1] *of projecting images from a two-dimensional light valve onto a continuously moving object, said method comprising placing a scanning element between said light valve and said object, said scanning element syncrhonized with said light valve and said object in a manner which makes said image stationary relative to said object* wherein said object is a printed circuit board.

6. A method as in claim [1] *2* wherein said scanning element is a galvanometer driven mirror.

8. A method of projecting images from a two-dimensional light valve onto an object while relative motion exists between said light valve and said object, said method comprising placing a scanning element between said light valve and said object, said scanning element making said images temporarily stationary relative to said object *wherein said object is a liquid photopolymer*.

11. A method as in claim [10] *13* wherein said scanning element is a galvanometer driven mirror and said galvanometer includes provisions for electronically controlling scan linearity.

13. A method [as in claim 10] *of projecting images from a two-dimensional light valve onto a continuously moving object, said light valve generating a rapid sequence of stationary images, said method comprising placing a scanning element between said light valve and said object, said scanning device making each one of said stationary images appear stationary relative to said moving object* wherein said object is a printed circuit board.

*14. A method of projecting images from a two-dimensional light valve onto an object while relative motion exists between said light valve and said object, said method comprising placing a scanning element between said light valve and said object, said scanning element making said images temporarily stationary relative to said object wherein said object is stationary and said method comprises moving said two-dimensional light valve and said scanning element relative to said object.*

*15. A method as in claim 14 wherein said object is a container of a liquid photopolymer.*

*16. A method as in claim 17 comprising producing a solid object from the liquid photopolymer.*

*17. A method as in claim 14 comprising operating said light valve to generate a rapid sequence of stationary images and operating said scanning element to make each one of said stationary images appear stationary relative to said object.*

* * * * *